Dec. 12, 1972 W. C. PERRY ET AL 3,705,933
AGGLOMERATION OF PHOSPHOR MATERIALS PRIOR TO CALCINATION
TO ELIMINATE CALCINING IN RECEPTACLES
Filed March 26, 1971

MEATBALL

CUPCAKE

BRIQUETTE

LOZENGE

COMPRESSED BRICK

William C. Perry,
Eugene F. Puttock,
Ronald L. Schreiber,
Inventors
Koenig, Senniger,
Powers and Leavitt,
Attorneys

United States Patent Office 3,705,933
Patented Dec. 12, 1972

3,705,933
AGGLOMERATION OF PHOSPHOR MATERIALS PRIOR TO CALCINATION TO ELIMINATE CALCINING IN RECEPTACLES
William C. Perry, Jennings, and Eugene F. Puttock and Ronald S. Schreiber, St. Louis, Mo., assignors to Mallinckrodt Chemical Works, St. Louis, Mo.
Continuation-in-part of application Ser. No. 15,922, Mar. 2, 1970. This application Mar. 26, 1971, Ser. No. 128,443
Int. Cl. C09k 1/36; B01j 2/00
U.S. Cl. 264—117                    13 Claims

ABSTRACT OF THE DISCLOSURE

Thermally refined phosphor material, such as alkaline earth haloapatite phosphor material, in the form of finely divided particles may be produced on a continuous basis in a furnace, without sticking of phosphor material to the furnace walls and without significant loss by volatilization of activator elements, by initially forming particles of precursor phosphor material capable of producing the desired phosphor material into coherent but still friable bodies. The compacted bodies are then continuously fed to a furnace, such as an inclined tubular furnace, where they are heated to incandescence to form and/or thermally refine the phosphor material. The compacted, thermally refined bodies of activated phosphors emanating from the furnace are easily crushed or rolled to yield activated phosphor granules in their original particulate form ready for use in fluorescent lamp coatings and the like.

CROSS-REFERENCE TO RELATED APPLICATION

This application is a continuation-in-part of application Ser. No. 15,922, filed Mar. 2, 1970, and now abandoned.

BACKGROUND OF THE INVENTION

The present invention is directed to a continuous process for producing thermally refined phosphors wherein a phosphor precursor material is heated to incandescence, the precursor material being in the form of particles of a size substantially the same as that desired in the final phosphor.

It is known to produce numerous luminescent phosphors, such as for example the well-known halophosphate phosphors by methods which involve, at least in part, heating a phosphor precursor material, which may be either a single chemical entity or an intimate mixture of several chemical entities to incandescence. In some cases, the precursor material may be a precipitated chemical substance whose stoichiometric composition corresponds essentially to that of the desired phosphor. Precursor materials of this kind are described in copending, coassigned U.S. applications Ser. No. 735,279, filed June 12, 1968, now U.S. Pat. No. 3,575,877, Ser. No. 7,408, filed Feb. 6, 1970, now U.S. Pat. No. 3,575,876 and Ser. No. 9,103, filed Feb. 9, 1970, now U.S. Pat. No. 3,598,751. The heating operation then serves primarily to thermally refine and increase the size of the phosphor crystallites. Alternatively, it is also known to produce such phosphors by the so-called ceramic process by heating a precursor material which comprises an intimate mixture of several chemical constituents. Many such mixtures are known and have been fully described in the literature. In that case, the heating operation serves both to form and thermally refine the desired phosphor.

Most of the phosphors to which the present invention is directed are formed and/or refined at temperatures corresponding to a yellowish-red heat (e.g., around 1100° C.). For some, a bright red or cherry red heat (around 900° C.) may be adequate. Temperatures substantially higher than around 1300° C. are seldom if ever required. Thus, for the purposes of the present invention, incandescence generally means a degree of temperature ranging from bright red (around 900° C.) to incipient whiteness (around 1300° C.) or even higher temperatures.

More particularly, the invention relates to a process for activating haloapatite phosphors by thermal refining and for the continuous production of thermally refined haloapatite phosphor material in a furnace.

Activated alkaline earth haloapatites are used as phosphors in the manufacture of fluorescent lamps. Such haloapatite phosphors may be represented by the general empirical formula:

$$Ca_{10}(PO_4)_6(F,Cl)_2:A$$

where A represents one or more activator ions such as antimony, manganese, various rare earth elements and the like. Such compositions may also contain smaller amounts of strontium and cadmium along with the calcium.

Traditionally, phosphors of this type have been prepared by firing a mixture of suitably purified and finely powdered source compounds whereby through a combination of solid phase reaction and diffusion a calcium haloapatite host lattice is formed in which are incorporated the necessary activators. Firing for an extended period has been thought necessary for the solid state reactions and diffusion operations to produce a product having the apatite structure.

In the above-noted conventional thermal or firing processes for producing phosphors, it is customary to place the precursor phosphor material in a receptacle, commonly called a boat, made from some nonreactive and refractory material such as quartz or the like (e.g., 96% silica marketed under the trade designation "Vycor" by Corning Glass Works). The receptacle is in turn supported on a flat rectangular base made from some less expensive refractory material and mechanically transported through a long tunnel-like furnace. The silica receptacles are not only expensive but they are relatively short-lived because of their susceptibility to thermal shock and strain. To minimize breakage of the receptacles, it is necessary to heat and cool them slowly. The need for slow heating and cooling of the receptacles militates against the brief heating time which has been found desirable for thermally refining precipitated haloapatites and other phosphor precursors.

More recently, improved processes have been developed for the preparation of alkaline earth haloapatite phosphors, involving precipitation of such phosphors from solutions containing their constituent components. When precipitation processes are used, activators may be incorporated in the precipitated haloapatite by either coprecipitation or subsequent treatment. Processes of this kind are more fully described in the above-noted copending, coassigned applications.

When precipitation processes are used, it has been found that the lengthy firing required to achieve a solid state reaction is avoided. To achieve full activation of the phosphors produced by these processes and to maximize their brightness, however, a relatively short period of thermal refining at a temperature of 1050°–1200° C. is still needed. The changes which occur during this thermal refining treatment are not fully understood, but they appear to include chemical interactions, elimination of occluded impurities, perfection and growth of crystals and the like. The effect of this thermal treatment is a refinement of the chemical composition and crystal structure of the haloapatite phosphor material.

Prior to the present invention, thermal refining of haloapatite phosphor material was carried out by placing the nonrefined material in a suitable "boat" or crucible and heating the loaded crucible in a muffle furnace. This was necessarily a batchwise process. Alternatively, the crucible could be mechanically transported through a tunnel furnace.

To avoid the laborious loading and unloading of the crucible and to provide a continuous process without the necessity of equipment for mechanical transport, it is highly desirable to continuously feed the haloapatite material to one end of a heated tube or chamber and continuously remove the refined material from the other end. In the past, however, this has not been found to be a practical approach and the use of the above-noted refining procedures has been considered necessary for numerous reasons. Among these may be mentioned sticking of the particles of material to each other and to the walls of the furnace, thereby impeding the flow of material through the furnace, thermal dissociation and/or volatilization of activator elements such as antimony and the criticality of both time and temperature in order to refine a given phosphor material properly.

These phosphor materials are generally in the form of finely divided particles (i.e., fine granular or crystalline powders) and when these particles stick to each other and to the wall of the furnace, it is difficult or impossible to refine the material uniformly and properly. Moreover, since these phosphor materials are ultimately used in the form of fine granular or crystalline powders, any agglomerates which form during refining by reason of the particles sticking together must be crushed to yield the desired size particles. However, agglomerates formed in furnaces have been found to be very hard and reducible to their original particle size only by harsh milling or grinding. Such harsh grinding adversely affects the luminescent activity of the refined phosphor.

The above-noted problems are compounded if the phosphor material is a heterogeneous mixture of two or more different compounds rather than a substantially homogeneous phosphor material prepared by a precipitation process and having the required activators and other elements already incorporated therein.

Because of the advantages otherwise accuring from continuous thermal refining of phosphor materials in a furnace, there has been an unfulfilled need in the art for a practical process for the continuous thermal refining of alkaline earth haloapatite phosphor materials so as to avoid the above-noted problems of sticking and volatilization of essential elements during the refining operation. There has also existed an unfulfilled need for a practical method for continuously producing thermally refined phosphors which does not require the use of expensive and fragile receptacles for the phosphor precursor material.

SUMMARY OF THE INVENTION

Among the objects of the present invention, therefore, may be noted the provision of a process for the continuous production of thermally refined phosphor materials; the provision of a process for the continuous thermal refining of haloapatite phosphor materials which yields phosphors having excellent light absorption and emission properties; the provision of a process of this character for the continuous producing of thermally refined phosphor materials in a furnace which avoids the need for using crucibles and substantially eliminates sticking of the particles of phosphor material together; the provision of a continuous process for producing thermally refined phosphors which does not require the use of expensive and fragile receptacles for the phosphor precursor material; the provision of a process for the continuous thermal refining of haloapatite phosphor materials in a furnace which minimizes the volatilization of essential elements such as antimony; and the provision of a process for the continuous production of thermally refined phosphor materials which yields phosphor products in the desired particulate form. Other objects will be in part apparent and in part pointed out hereinafter.

The present invention is thus directed to a process for continuously producing a thermally refined phosphor material in the form of finely divided particles which involves the steps of first forming a particulate precursor material capable of producing the desired phosphor material upon being heated to incandescence into coherent, friable bodies of approximately uniform size, continuously feeding the bodies into a furnace adapted to heat the bodies to incandescence, continuously passing the bodies through the furnace at a rate such that the bodies are heated to incandescence thereby producing bodies of thermally refined phosphor material, and thereafter crushing the thermally refined bodies to reduce the phosphor material to its original particulate form. The present invention is also directed to a process for the continuous thermal refining of an alkaline earth haloapatite phosphor precursor material in the form of finely divided particles which involves the steps of first forming the particles of haloapatite phosphor precursor material into coherent, friable bodies of approximately uniform size, continuously feeding the bodies to a furnace adapted to heat the bodies to a temperature of at least 1050° C., continuously passing the bodies through the furnace at a rate such that the bodies are heated to a temperature between approximately 1050° C. and 1200° C. to thermally refine the bodies, and thereafter crushing the thermally refined bodies to reduce the haloapatite phosphor material to its original particulate form.

DESCRIPTION OF THE PREFERRED EMBODIMENTS

In accordance with the present invention, it has now been found that thermally refined phosphor materials having good luminescent properties may be produced in the form of finely divided particles on a continuous basis in a furnace by first compacting a particulate precursor phosphor material capable of producing the desired phosphor material into coherent but friable bodies. When these compacted bodies are used as the feed material and continuously fed to a furnace, the desired formation and/or activation of the phosphor material is accomplished without substantial volatilization of essential activator elements such as antimony. Moreover, the compacted bodies travel smoothly through the furnace without significant agglomeration or sticking thereof to the walls of the furnace. Movement of the compacted bodies through the furnace is facilitated not only by the avoidance of sticking per se, but also by the relatively high momentum which is acquired by the compacted bodies as compared to fine particles of uncompacted haloapatite material. To the extent that some surface wear and powdering of the compacted material does take place during the heating operation, the following compacted bodies effectively sweep such powder or granules as are thus generated through the furnace.

According to the present invention, the particulate phosphor precursor material prior to its being heated is first formed or molded into coherent friable bodies of substantial size. These bodies may be of whatever size and shape is most appropriate for the particular furnace in which they are to be fired. In forming these bodies, only enough pressure is used so that they will retain their form during the firing operation. If too much pressure is used, the fired bodies may become excessively hard and difficult to crush whereas it is desirable that the particles should be no more than lightly sintered during the firing operation.

Figure 1:
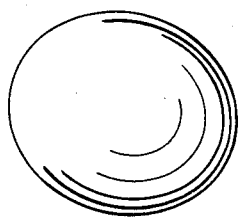
FIGS. 1–5 are illustrative of various exemplary forms or configurations in which the coherent, friable bodies used in the practice of the present invention may be produced.
Figure 2:
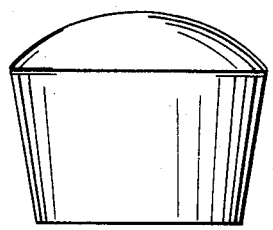
Figure 3:
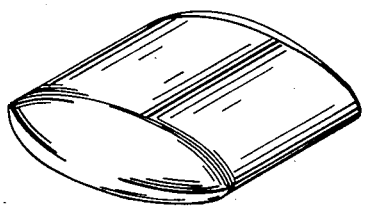
Figure 4:
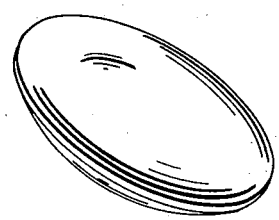
Figure 5:
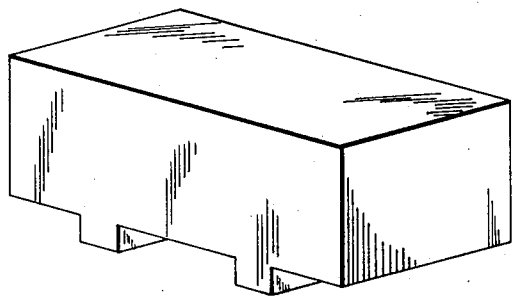

The shape and size of these coherent friable bodies may be varied over rather wide limits, though they are preferably rounded rather than rectangular. The area of contact between adjacent bodies and with the walls of the furnaces or other objects is thereby minimized. In form they may resemble somewhat flattened meatballs, cupcakes, charcoal-like briquettes, large lozenges, or the like. Some of these forms are further illustrated in FIGS. 1–5 of the accompanying drawings. FIG. 1 illustrates a meatball configuration, FIG. 2 illustrates a cupcake configuration, FIG. 3 illustrates a briquette configuration, FIG. 4 illustrates a lozenge configuration and FIG. 5 illustrates a particular form of compressed brick configuration. The size of the bodies should be as large as possible consistent with other considerations mentioned hereafter. First, it is desirable that the surface of the body relative to its total weight should be kept small in order to minimize exposure of the phosphor material, either precursor or thermally refined, to the atmosphere and contact with the furnace or other objects. On this latter point, configurations such as that illustrated in FIG. 5 are particularly advantageous. On the other hand, the bodies should be capable of being rapidly heated and cooled, thereby imposing an upper limit on their practical size. Generally speaking, their optimum size is somewhere between that of ordinary dinner mints up to something not much larger than an ordinary meatball or charcoal briquette.

These bodies may be formed by compressing the dry particulate precursor material in a suitable device such as a compactor, using just sufficient pressure to form a coherent body which will remain readily friable. Alternatively, the precursor material may be moistened with some liquid medium such as water and then formed or molded into bodies of the desired shape and size. In the latter event, the major constituents of the precursor material should be substantially insoluble in the liquid medium so that their particulate character will not be destroyed.

The coherent, friable bodies used in the practice of the present invention serve several advantageous functions and purposes:

(1) They obviate the need for confining or enclosing the precursor material in a foreign vessel such as a crucible.

(2) These coherent bodies can be more rapidly heated and cooled than can a similar amount of material contained in a crucible or other container. Not only does this have a benficial effect on the quality of the finished phosphor, but it also increases the efficiency and productivity of the firing operation.

(3) If the particle size of the finished phosphor is established in the precursor material and the fired coherent bodies are only lightly sintered, then only mild crushing is necessary to reduce the thermally refined phosphor material to the particle size of the original precursor material. Thus the need for drastic milling is avoided and loss of product due to the production of fines is minimized.

The aforementioned coherent friable bodies of the phosphor precursor material may be converted to thermally refined phosphor using any furnace capable of heating them to incandescence. These bodies are particularly useful, however, when fired in a continuous furnace of the rotary kiln type as described hereinafter in greater detail.

The course of this firing operation can also be described in terms of the temperature profile for any given phosphor precursor material. In order to produce the desired thermally refined phosphor, the phosphor precursor material must be heated above some "critical" temperature. At the temperatures below this critical temperature, various undesired reactions and changes may occur.

To minimize the effect of these detrimental changes, which probably involve vaporization of essential elements, oxidation-reduction reactions, and crystalline transformations, the thermally refined phosphor should be allowed to cool as rapidly as possible to a temperature well below that at which such changes occur, for example below about 600° C.

For most phosphors, the critical temperature will lie somewhere above 800° C., commonly around 1100° C. In some instances it may be necessary to heat the phosphor precursor material to an even higher temperature, e.g., 1500° C. or more. However, the basic features of the invention remain essentially unchanged no matter what phosphor is to be produced or what minimum temperature is necessary in order to produce it.

If the coherent bodies of phosphor precursor material are to be fired in a stationary, essentially horizontal furnace rather than a rotary kiln, then it is desirable that they be placed upon a movable support made of some suitable refractory material. The support may be in the form of a brick or plate, and may have a slightly concave or dish-shaped surface so that the coherent bodies will be less likely to fall off when the support is moved. Such supports bearing the coherent friable bodies may be pushed through a tunnel furnace, for example, in much the same manner as a locomotive pushes a string of boxcars. In either case, the phosphor precursor material is not confined or enclosed during the firing operation, and since it is heated directly by thermal radiation from the walls of the surrounding furnace and is not shielded by some intervening object such as crucible, the desired rapid heating and cooling of the phosphor material is thereby more readily achieved.

In one embodiment, the novel process of the present invention is directed to the continuous thermal refining of precipitated haloapatite phosphor materials having fluorescent activators, such as antimony, incorporated therein. The preparation of such precipitated haloaptites is more fully described in the aforementioned coassigned and copending applications, although it will be understood that such precipitation methods do not constitute part of the present invention. The precipitates produced by these methods are in the form of finely divided powders with the average particle size usually being within the range of about 3–30 microns.

While the invention is directed to the continuous thermal refining of the above-noted precipitated haloapatite phosphors, it is also useful as noted above for the continuous thermal refining of other phosphor precursor materials and for forming and thermally refining various phosphor precursor materials on a continuous basis to produce the desired phosphors. For example, it may be applied to the thermal refining of the calcium fluophosphate and ammonium chloride combination disclosed in Netherlands Pat. 83,922 (Dec. 16, 1956). It is also useful in thermally refining a plate-like calcium phosphate together with other components as disclosed in King et al. U.S. Pat. 3,242,369. Further, as illustrated hereinafter, the invention is useful for producing phosphor materials heretofore produced by the conventional ceramic process through the forming and thermal refining of the phosphor material from a precursor phosphor material composed of an intimate mixture of the various chemical constituents of the phosphor material.

In the practice of the present invention, precursor phosphor materials of the above type in either wet or dry form may be used as the starting material for preparing the compacted or coherent bodies. For example, the starting material may be in the form of a wet filter cake recovered from a precipitation process by which a haloapatite phosphor material has been prepared.

The finely divided starting material in either wet or dry form, may be formed into compacted bodies by any of a wide variety of different means. By whatever means used, this material should be compacted in a manner such that the bodies formed are sufficiently cohesive to withstand handling prior to and during thermal refining without excessive breakage or crumbling, yet not so hard that vigorous milling or grinding is necessary in order to reduce the thermally refined bodies to their original particulate form. Preferably, the bodies should be just friable enough so that they can be crushed between the fingers. As previously noted, the size and shape of the coherent compacted bodies formed for use in the present invention may be varied over rather wide limits. In order that they may be heated completely and uniformly to the required temperature, they are preferably of substantially uniform size and shape.

In one illustrative embodiment of this invention, a wet filter cake of precipitated haloapatite material is simply broken into lumps, e.g., the size of walnuts, and dried. Alternatively, the filter cake can be cut into blocks of more uniform size and shape, or the bodies may be made by pressing the filter cake into suitable molds, such as, for example, a cupcake tin. When dried, such bodies are sufficiently coherent to retain their form and size during the continuous thermal refining operation and yet are sufficiently friable that the thermally refined bodies can be easily crushed to restore the phosphor material to its original finely divided form.

In a preferred form of the invention, the dry powdered haloapatite is pressed into pillow-shaped bodies or briquettes using a suitable die or mold. The longitudinal, lateral and vertical dimensions of these pillow-shaped briquettes may vary widely, but dimensions of about ¾" by 1" by ½" are particularly convenient for thermal refining. The pillow-shaped form is particularly useful since bodies of this shape, being somewhat flattened and without sharp corners or edges, gravitate easily and at a uniform rate through a moderately inclined rotary kiln or tubular furnace. Provided that excessive pressure is not used in forming them, the briquettes are friable and only mild crushing or rolling is sufficient to reduce them to the desired powdery granular form.

A suitable device for preparing the above-described pillow-shaped bodies comprises two parallel substantially contiguous cylindrical rolls which are adapted to rotate at substantially the same rate and have indentations disposed oppositely along their line of contact. Each indentation is in the shape of one-half of the pillow-shaped briquette to be produced. The haloapatite powdered material is fed between the rollers by means of an auger type mechanism. A typical compactor of this design is the Model 25 CS compactor manufactured by Komerak-Greaves Co. In this device, pressure is applied by means of an hydraulic system. Using this device, pillow-shaped briquettes ¾" by 1" by ½" have been prepared using a pressure of about 600 p.s.i. on the rolls. The briquettes thus formed have been successfully thermally refined in a tubular furnace without sticking and without significant loss by volatilization of essential activators such as antimony.

Where the starting material is a wet material, the compacted haloapatite bodies should be dried before refining in order to allow rapid heating of the haloapatite in the furnace and effective refining thereof. Any convenient means known to the art may be used to dry these bodies.

In the practice of this invention, a number of different furnace designs can be used. Preferably, the furnace employed should be inclined somewhat from the horizontal and is provided with means for revolving it so that compacted material added at the upper end is propelled through the furnace primarily by the force of gravity. There is no inherent limitation on the degree of inclination and fully vertical furnaces can, in fact, be used. It should be understood that horizontal furnaces could also be used but would normally require the use of mechanical aids to move the haloapatite bodies through the furnace and are therefore less desirable.

The furnace used for thermal refining should preferably be tubular and be fabricated of or lined with a refractory material such as aluminum oxide. The furnace must be capable of heating the haloapatites to a temperature of at least 1050° C. Its size is not otherwise critical.

A preferred furnace for the purposes of the present invention is of the type known as the rotary kiln. It consists essentially of a tube made from some substantially refractory and chemically inert material such as mullite, or high purity alumina, the tube being mounted at an angle to the horizontal and provided with means for revolving it so that the bodies fed into the furnace at the upper end can tumble through the furnace propelled by gravity, with all surfaces of the feed bodies being exposed to the heated inert atmosphere. If the angle of inclination is relatively steep, the weight of the material at the upper end will, of course, help to push material through the lower end of the furnace.

An example of a suitable furnace is the rotary kiln manufactured and sold under the trade designation Model RT-472-103 by the Pereny Equipment Co. This kiln furnace has a 30 kilowatt heating capacity. The tube of this kiln has an inside diameter of 4⅜" and a length of 72", and is fabricated of mullite. The kiln has three independently controlled heating elements each with its own thermocouple and temperature controller.

Continuous thermal refining producing a haloapatite phosphor material with good luminescent properties has been satisfactorily carried out in the above-described furnace with the three temperature zones controlled at about 1050° C., 1100° C., and 1050° C., respectively. The furnace tube was rotated at about one revolution per minute and the tube was inclined at such an angle that the residence time of the briquettes in the furnace was approximately 40 minutes.

It will be understood that the compacted haloapatite bodies may also be refined continuously in a stationary inclined or vertical tubular furnace. A rotating furnace, such as the above-described kiln, is preferred, however, since the rotating action contributes to more uniform heating and assists the travel of the haloapatite bodies through the furnace.

After the haloapatite is thermally refined, it is reduced to its original particulate form. For coating fluorescent lamp tubes, a particle size range of 3-30 microns is usually preferred. If the haloapatite bodies are formed in accordance with this invention as described above, a minimum degree of sintering occurs in the refining step. Thus, the refined bodies may be easily crushed as by means of a rolling pin or the like. Any milling device having a mild crushing effect will serve as well. As mentioned above, drastic milling or grinding should be avoided. When the haloapatite bodies are crushed in the desired manner, a highly activated haloapatite material is produced which is useful in the manufacture of fluorescent lamps.

The following example illustrates the forming and thermal refining of a phosphor material in accordance with the invention.

The phosphor precursor material employed had the following composition:

|  | G. |
|---|---|
| $CaHPO_4$ | 850 |
| $CaCO_3$ | 250 |
| $CaF_2$ | 75 |
| $Sb_2O_3$ | 13 |
| $CdCO_3$ | 21 |
| $MnCO_3$ | 25 |
| $NH_4Cl$ | 17 |

This mixture corresponds to that for producing a cool white phosphor by conventional ceramic methods.

The mixture was first thoroughly mixed for several hours on a roller mill. A 500 g. portion was spread out in a glass pie dish and sprayed with 185 g. of water. The damp cake, which was approximately ½" thick, was dried overnight at 100° C., removed from the dish, and broken up into pieces approximately ½" by ½" by ¾" in size.

The compacted mix in the form of the above pieces was heated in the rotary kiln furnace previously described with the three temperature zones controlled at about 1050° C., 1100° C., and 1050° C., respectively. The furnace tube was rotated at about one revolution per minute and the tube was inclined at such an angle (5 in.

in 6 ft.) that the residence time of the pieces was approximately 40 minutes.

The thermally refined phosphor material thus produced was essentially comparable to the phosphor material produced by conventional ceramic processes.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. In a method of producing a thermally refined phosphor material in the form of finely divided particles comprising placing a particulate precursor material capable of producing the desired phosphor material upon being heated to a temperature of at least 800° C. in a receptacle such as a boat or a crucible, heating said receptacle of material to at least 800° C. to produce the desired reactions, cooling said receptacle of material, removing the cooled material from said receptacle and crushing the material to the desired particle size, the improvement comprising eliminating the use of the receptacles by compacting said particulate precursor material into coherent, friable bodies of approximately uniform size using sufficient forming pressure so that the compacted bodies will retain their form and friability during the heating operation, continuously feeding said bodies into a furnace, heating said bodies to at least 800° C., cooling said bodies, and crushing the lightly sintered bodies to obtain the desired particle size.

2. A process as set forth in claim 1 wherein said bodies are allowed to cool rapidly after being heated to incandescence in said furnace.

3. A process as set forth in claim 1 wherein the furnace is a rotary kiln inclined at a slight angle to the horizontal, the coherent, friable bodies being continuously fed into the upper end of said kiln and the thermally refined bodies being continuously removed from its lower end.

4. A process as set forth in claim 1 wherein the furnace is a stationary, horizontal furnace and said bodies travel through said furnace upon a movable support.

5. A process as set forth in claim 1 wherein said precursor material is an alkaline earth haloapatite phosphor material and said bodies are heated to a temperature between 1050° C. and 1200° C.

6. A process as set forth in claim 5 wherein a moist filter cake of the haloapatite phosphor material in the form of finely divided particles is molded to form bodies of substantially uniform size and shape and thereafter dried.

7. A process as set forth in claim 5 wherein a moist filter cake of the haloapatite phosphor material in the form of finely divided particles is broken into lumps of approximately uniform size and thereafter dried.

8. A process as set forth in claim 5 wherein the furnace is a rotary kiln inclined at a slight angle to the horizontal, the coherent, friable bodies being continuouslyl fed into the upper end of said kiln and the thermally refined bodies being continuously removed from its lower end.

9. A process as set forth in claim 5 wherein the haloapatite phosphor material is a precipitated alkaline earth haloapatite phosphor having at least one activator incorporated therein.

10. A process as set forth in claim 9 wherein the activator is antimony.

11. A process as set forth in claim 5 wherein the finely divided particles of said haloapatite phosphor material are compressed into briquettes of substantially uniform size and shape.

12. A process as set forth in claim 11 wherein the briquettes are formed by feeding finely divided particles of said haloapatite phosphor material between two parallel and substantially contiguous cylindrical rolls rotating at substantially the same rate, said rolls having indentations disposed oppositely along their line of contact with each indentation being in the shape of one symmetrical half of the briquettes produced.

13. A process as set forth in claim 11 wherein the finely divided particles of said haloapatite phosphor material are compacted into pillow-shaped briquettes of substantially uniform size and shape.

References Cited

UNITED STATES PATENTS

| 2,755,254 | 7/1956  | Butler        | 252—301.4   |
| 3,476,511 | 11/1969 | Sullivan      | 23—110      |
| 3,351,194 | 11/1967 | Bulter et al. | 117—33.5    |
| 3,242,369 | 3/1966  | King et al.   | 117—33.5    |
| 3,607,116 | 9/1971  | Thomas et al. | 252—301.4 P |
| 3,637,519 | 1/1972  | Piper         | 252—301.4 P |
| 3,654,173 | 4/1972  | Thomas et al. | 252—301.4 P |
| 3,654,174 | 4/1972  | Dale et al.   | 252—301.4 P |
| 3,657,140 | 4/1972  | Gibbons et al.| 252—301.4 P |

FOREIGN PATENTS

| 868,711 | 5/1961 | Great Britain | 252—301.4 P |

OTHER REFERENCES

J. E. Browning: "Agglomeration," appearing in the December 1967 issue of Chemical Engineering at pp. 147–170.

Samuel Wyatt: "U.S. Radium Boosts Quality as It Reduces Costs," Ceramic Age, February 1971, at 13–15.

DONALD J. ARNOLD, Primary Examiner

J. H. MILLER, Assistant Examiner

U.S. Cl. X.R.

23—313; 252—301.4 P; 264—57